Dec. 21, 1926. 1,611,159
G. A. BUVINGER ET AL
PUMPING APPARATUS
Original Filed Nov. 18, 1921
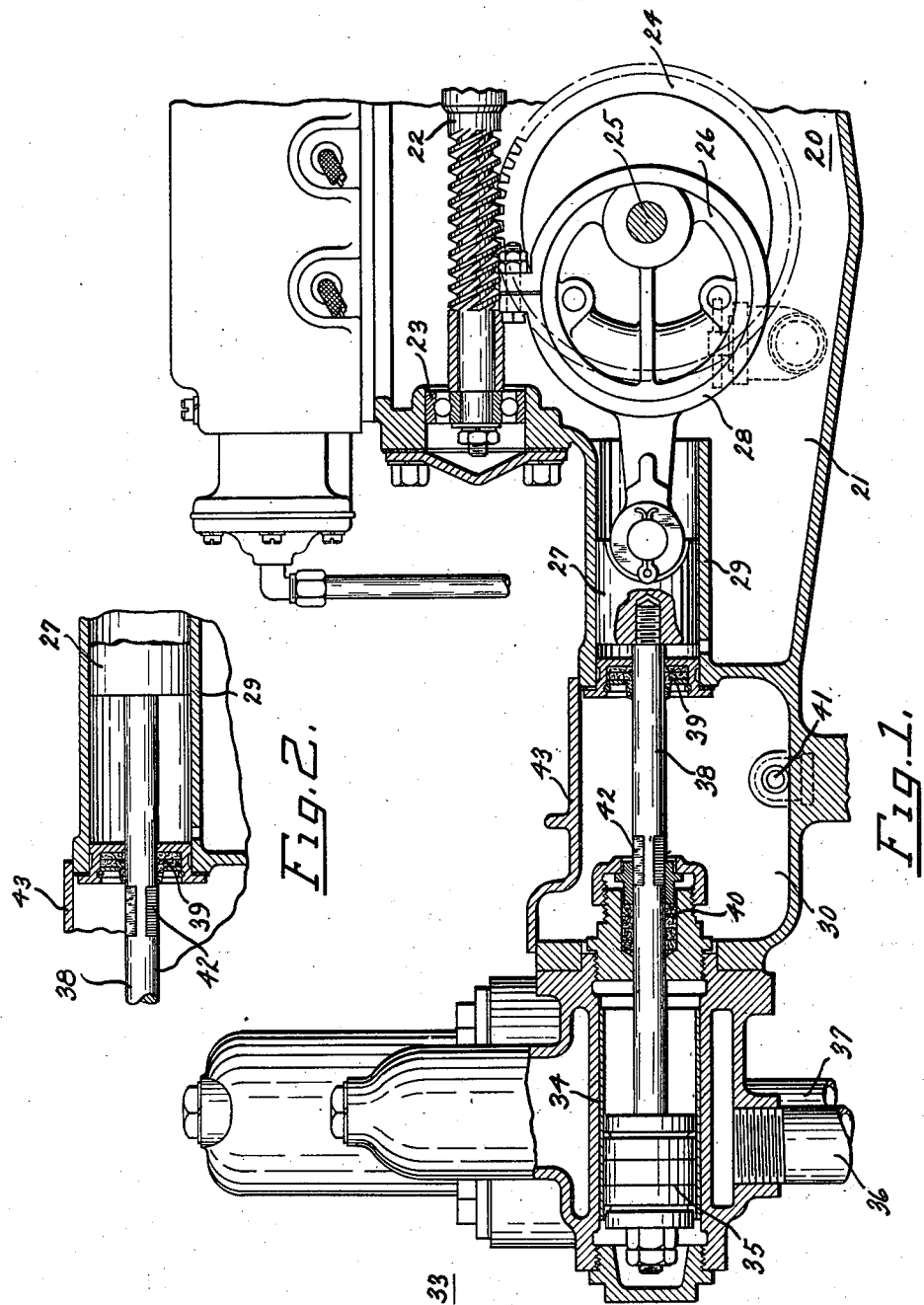
Inventors
George A. Buvinger
Clarence Warner
By J. Ralph Frehr.
Their Attorney Patented Dec. 21, 1926.

1,611,159

UNITED STATES PATENT OFFICE.

GEORGE A. BUVINGER AND CLARENCE WARNER, OF DAYTON, OHIO, ASSIGNORS TO DELCO-LIGHT COMPANY, OF DAYTON, OHIO, A CORPORATION OF DELAWARE.

PUMPING APPARATUS.

Original application filed November 18, 1921, Serial No. 516,159. Divided and this application filed September 4, 1923. Serial No. 660,706.

The present invention relates to pumps and particularly to pumps of the reciprocating piston type and is a division of the copending application Serial No. 516,159 filed November 18, 1921.

One of the objects of the present invention is to prevent the contamination of the water within the pump chamber by lubricant from the driving mechanism lubricant chamber and vice versa.

Another object of the invention is to facilitate the removal of the piston and piston rod from the pump.

Other and further objects of the present invention will be apparent from the following description, reference being had to the accompanying drawings, wherein a preferred embodiment of the present invention is clearly shown.

In the drawings:

Fig. 1 is a longitudinal sectional view of a portion of a pump unit, the pump piston rod being shown in one of its extreme operating positions; and Fig. 2 is a fragmentary sectional view showing the piston rod at its other extreme position.

The present invention contemplates the provision of a pump unit which includes a driving mechanism chamber or casing and a pump head. The pump head is provided with a cylinder and piston, the piston being connected with driving mechanism in the casing by a reciprocating piston rod. The casing and pump head are spaced at such a distance that the part of the rod which enters the housing will not enter the pump head and vice versa, whereby the liquid contents of the housing and pump head is not apt to be transferred by the piston rod from one chamber to the other.

The invention further aims to provide a piston rod having a designated place which is readily visible and at which a wrench may be applied for the manipulation of same for assembling or disassembling purposes.

Referring to the drawings, 20 is a casing for driving mechanism and forms a reservoir 21 for lubricant. The driving mechanism comprises a worm 22 suitably started in bearings, one of which is shown at 23. Worm 22 is rotated in any suitable manner and drives a worm gear 24. Worm gear 24 is carried on a shaft 25 and drives an eccentric 26 which is connected to a crosshead 27 by an eccentric strap 28 which herein functions as a connecting rod. Crosshead 27 is slidably mounted within a sleeve 29 formed integrally with the casing 20.

Casing 20 also forms a drip box 30 to which is detachably secured the pump head 33. Pump head 33 receives a cylinder 34 and a piston 35 which when reciprocated will cause water to be drawn through the pipe 36 and to be forced out of pipe 37. A pump piston rod 38 extends from the reservoir 21 through drip box 30 into the pump head 33. A packing box 39 or the like is provided between the drip box 30 and reservoir 21; and a packing box 40 or the like is provided between drip box and the pump head 33. These packing boxes surround the piston rod 38 and are subjected to the liquid within the respective chambers and normally prevent lubricant and water from escaping from the driving mechanism casing 20 and the pump head 33, respectively. If any liquid should escape, it will collect in the drip box 30 and may be drained off through a drain 41.

The drip box 30 is of such a length that the packing boxes can be placed at a distance far enough apart with respect to the length of the reciprocating stroke of the piston rod 38, that the portion of the piston rod 38 which enters one of the packings will not enter the other. In this manner, that portion of the piston rod which comes in contact with the oil packing 39 does not come in contact with the water packing 40, and therefore no oil will be carried to the water packing and thence to the pump head 33. Likewise, that portion of the piston rod 38 entering the water packing cannot enter the oil packing and will not carry water into the oil packing and thence into the lubricant reservoir 21. In this manner, there is a portion of the rod between the packings 39 and 40 which does not enter either of the packings. This portion is squared as at 42 to form a tool hold for a wrench. Tool hold 42 is always readily visible when the drip box cover 43 is removed, and when it is necessary to disconnect the piston rod 38 from the crosshead 27 for the removal of said rod and piston 35, the attendant will use a wrench at the tool hold 42. If the attendant should use a wrench which would mutilate the tool hold 42, no damage would be done to the packings because the tool hold does not enter either of them. If no tool hold were provided, it would be necessary to use a Stillson wrench or the like. This type of wrench is very apt to mutilate the piston rod; also without the tool hold no special place would be indicated at which the wrench should be applied; and, it will often happen that the rod will be mutilated at a place which enters the packing, and thereby damage same due to the reciprocation of the mutilated portion of the piston rod within the packing.

While the form of mechanism herein shown and described constitutes a preferred embodiment of one form of invention, it is to be understood that other forms might be adopted and various changes and alterations made in the shape, size, and proportion of the elements therein without departing from the spirit and scope of the invention.

What is claimed is as follows:

1. In a device of the kind described, a pump unit comprising in combination, a cylinder and piston, a crosshead and guide therefor, a piston rod connecting said guide and piston, and separate packing for the rod adjacent the guide and cylinder respectively, the guide and cylinder being located at such a distance from one another that no portion of the rod entering the packing adjacent said cylinder can enter the packing adjacent the guide.

2. In a device of the kind described, a pump unit comprising in combination, a pump head; a casing adapted to contain a quantity of lubricant; a drip box located between the casing and pump head; reciprocating means extending from the casing to the pump head; and separate packing in the pump head and in the casing respectively surrounding the reciprocating means, said drip box being of such length that no portion of the reciprocating means entering one of the packings can enter the other when the said reciprocating means moves in either direction.

3. A pump unit comprising a chamber, a reciprocating member entering said chamber, a packing about the reciprocating member, said reciprocating member being provided with a tool hold on that portion thereof which does not enter the packing.

4. A pump unit comprising two spaced chambers, a reciprocating member between and entering said chambers, packing about the reciprocating member at the entrance to said chambers, said reciprocating member being provided with a tool hold on that portion thereof which does not enter either packing upon movement of said member in either direction.

5. A pump unit comprising two spaced chambers, a reciprocating member between and entering said chambers, packing in one of said chambers for said reciprocating member, said reciprocating member being provided with a tool hold on a portion that does not enter said packing.

6. In a device of the kind described, a pump unit comprising two spaced chambers, a reciprocating member between and entering said chambers, packing about the reciprocating member at the entrance to said chambers, said member being provided with a tool hold between the chambers and on a portion that does not enter said packings upon the movement of the reciprocating member in either direction, a housing for said member, said housing having an opening adjacent the tool hold, and a cover for said opening.

In testimony whereof we hereto affix our signatures.

GEORGE A. BUVINGER.
CLARENCE WARNER.